United States Patent [19]

Kim

[11] Patent Number: 4,531,552
[45] Date of Patent: Jul. 30, 1985

[54] CONCENTRIC INSULATING CONDUIT

[75] Inventor: Yung J. Kim, Hacienda Heights, Calif.

[73] Assignee: Baker Oil Tools, Inc., Orange, Calif.

[21] Appl. No.: 491,864

[22] Filed: May 5, 1983

[51] Int. Cl.³ ............................................. F16L 59/12
[52] U.S. Cl. .................................... 138/149; 138/113; 138/114; 62/55
[58] Field of Search ................ 138/113, 114, 148, 149; 285/47; 62/55

[56] References Cited

U.S. PATENT DOCUMENTS

| | | | |
|---|---|---|---|
| 2,735,449 | 2/1956 | Grahame | 138/113 |
| 2,750,963 | 6/1956 | Bond | 138/113 |
| 2,914,090 | 11/1959 | Isenberg | 138/113 |
| 2,924,245 | 2/1960 | Wilson | 138/64 |
| 2,938,569 | 5/1960 | Goodrich | 138/113 X |
| 3,213,889 | 10/1965 | Cotman | 138/113 |
| 3,511,282 | 5/1970 | Willhite et al. | 138/113 |
| 3,530,680 | 9/1970 | Gardner | 138/113 X |
| 3,574,357 | 4/1971 | Tirgoviste et al. | 285/47 |
| 4,233,816 | 11/1980 | Hensley | 138/113 X |
| 4,396,211 | 8/1983 | McStravick et al. | 285/47 |

FOREIGN PATENT DOCUMENTS 1937795  2/1971  Fed. Rep. of Germany ...... 138/113

Primary Examiner—James E. Bryant, III
Attorney, Agent, or Firm—Norvell & Associates

[57] ABSTRACT

A concentric insulating tubular conduit member for use in forming a conduit string, such as a tubing string in a subterranean well, is disclosed. Each individual concentric conduit comprises an outer tubing and an outwardly flared inner tubing welded to the outer tubing at the ends. Insulation may be contained within the sealed annular cavity between the inner and outer tubing members and between inner and outer coupling members at the juncture between adjacent tubing sections. Centralizers are positioned in the annular cavity between the inner and outer tubular members at one or more points between the ends of each conduit section. Each centralizer has an axially extending cylindrical section and a radial support section in contact with one of the tubular members.

9 Claims, 4 Drawing Figures

CONCENTRIC INSULATING CONDUIT

BACKGROUND OF THE INVENTION

1. Field of the Invention

This invention generally relates to an insulated conduit having particular utility in subterranean wells and more particularly to a concentric walled insulated conduit having an annular space between the walls within which an insulating material is deposited and sealed therein.

2. Description of the Prior Art

In producing some subterranean wells, steam is injected into an injection well to increase recovery of hydrocarbons by reducing high viscosity crude oil, otherwise known as "heavy crude". The lower viscosity makes the oil more readily pumpable. One technique for doing this is to inject a high quantity of steam into the production zone containing "heavy crude" for an extended period of time, such as from about three to about five weeks. At that point, the viscosity of the heated crude will be reduced and will be readily pumpable through a production well in communication with the production zone. The injection well may also be modified for production. A steam "flood" may also be provided by known techniques, generally through an injection well, to drive the flood and the produced hydrocarbons into a nearby production well.

One of the major problems in injecting steam into a subterranean production zone through conventional well production tubing is that the steam loses a large quantity of its heat to the well bore casing and surrounding formation as it travels downwardly to the production zone. Attempts have been made in the past to reduce the heat loss of steam introduced into subterranean formations. One such attempt is disclosed in U.S. Pat. No. 3,511,282, issued on May 12, 1970. This patent discloses a dual-wall tube structure having insulation sealed in the annulus between the inner and outer walls by bushings respectively welded at each end between the inner and outer walls by bushings respectively welded at each end between the inner wall and the outer wall. The inner wall is prestressed in tension prior to being welded to the outer wall. The space defined between the inner and outer walls is filled with a conventional insulating material, such as calcium silicate. Although satisfactory in some oil field installations, large temperature differentials are encountered between the inner and outer walls, structural support must be provided between the inner and outer walls. In this case, even though the inner wall is prestressed in tension, the inner wall, as it is heated, will elongate with respect to the outer wall so that the inner wall may even change from a tension to a compression condition with the attendant danger of buckling. Centralizers are incorporated to reduce buckling but these centralizers introduce a heat loss path between the hotter inner tubular member and the colder outer tubular member. Centralizers have been fabricated using cordierite in an annular ring configuration and in a segmented configuration in which axial circumferential discontinuous lengths segments are attached to the inner member to support the outer member.

Concentric walled thermal insulating conduit is also disclosed and claimed in U.S. patent application Ser. No. 264,728 entitled CONCENTRIC WALLED CONDUIT FOR TUBULAR CONDUIT STRING, and U.S. patent application Ser. No. 272,411 entitled INSULATING TUBULAR CONDUIT APPARATUS AND METHOD. The tubular conduits disclosed therein comprise concentric tubular members in which the inner tubular member has flared ends welded to the outer tubular member adjacent each end. Insulation is provided within the annular area between the two tubular members for reducing heat loss during steam injection. Insulating centralizer supports preferably formed of a material such as calcium silicate are employed to prevent buckling.

SUMMARY OF THE INVENTION

A concentric walled insulating tubular conduit for forming a tubular string in a subterranean well has an inner tubing member with flared ends. The flared inner ends are fabricated by forging the ends of a tubular member having upset or enlarged ends and the inner tubular member is then welded directly to the outer tubular member at each end. The inner tubing member is preferably prestressed in tension relative to the outer tubular member.

An exterior coupling joins adjacent members by conventional threaded engagement with the outer tubing and an inner coupling member extends between flared sections of the inner tubing ends. Insulation may be incorporated between the interior and exterior coupling and in a sealed annular cavity between the inner and outer tubing. Blanket insulation and a shield having a low thermal emmissivity are provided in the axially extending cavity. One or more centralizers are positioned in the annular cavity to support the inner tubular member relative to the outer tubular member. Each centralizer has a cylindrical portion concentrically positioned relative to one tubular member. A radial planar support section contacts the other tubular member with minimal heat loss. The blanket insulation surrounds the radial planar support.

DESCRIPTION OF THE PREFERRED EMBODIMENT

Figure 1:
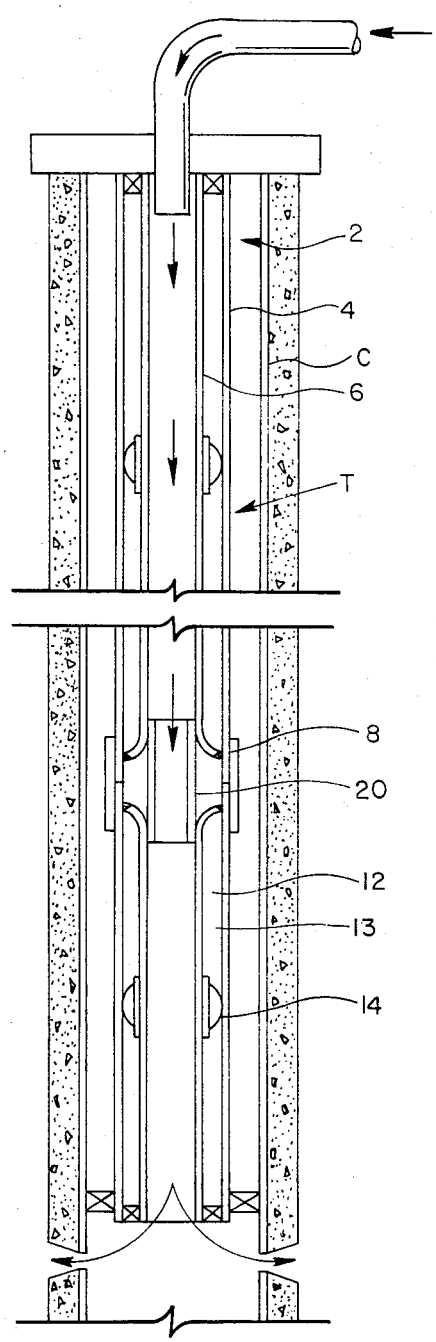
FIG. 1 is a schematic illustrating the injection of steam through a tubing string formed of individual conduit members constructed in accordance with this invention.

FIG. 1 illustrates, in schematic form, the use of a plurality of sections comprising concentric walled insulating tubing members formed in accordance with this invention, to construct an insulating tubing string. The tubing string T, shown in FIG. 1, permits the injection of steam at the surface of the well through the tubing to the formation therebelow. The insulated tubing string ensures that the heat loss between the surface and the formation will not be so excessive as to defeat the function of steam injection.

The tubing string T, comprising a plurality of individual insulating tubing conduits 2, is positioned within the well and within the well casing C in much the same manner as a conventional tubing string.

Figure 2:
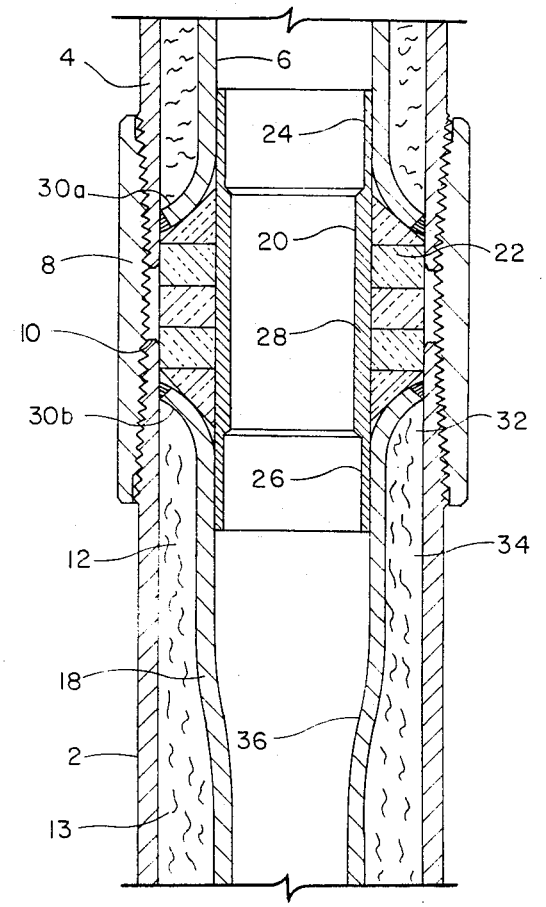
FIG. 2 shows two conduits coupled at their ends and this section view depicts the components of the preferred embodiment of this invention, including the centralizers.
Figure 2:
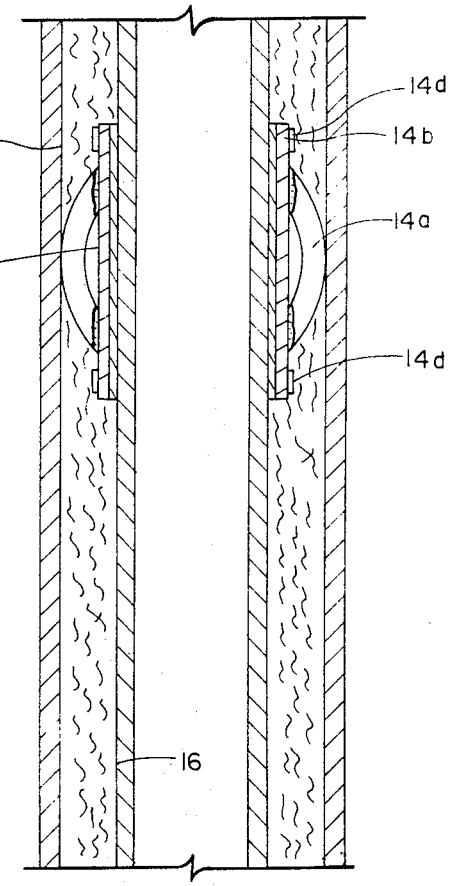
Figure 3:
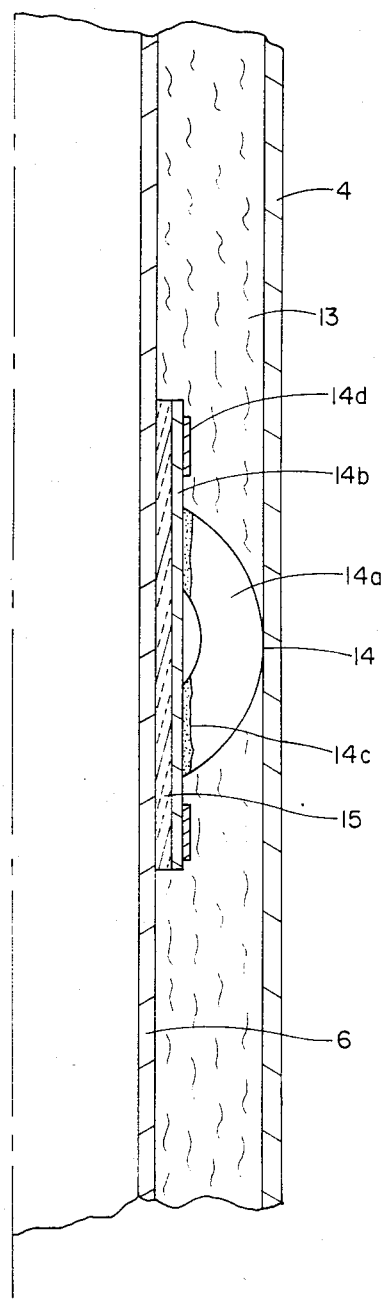
FIG. 3 is a view of one centralizer positioned between the inner and outer tubular members.
Figure 4:
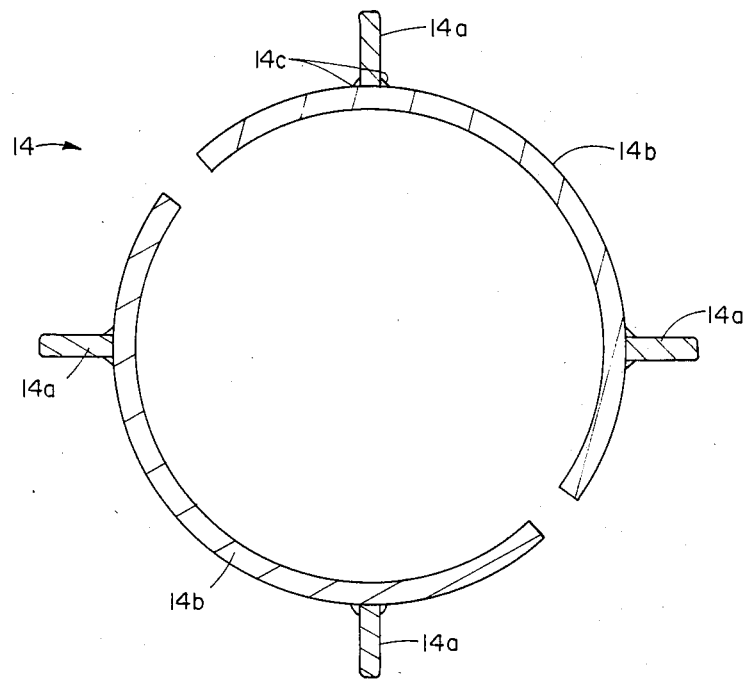
FIG. 4 is a sectional view showing the centralizers.

FIG. 2 shows the components of each individual conduit and the interconnection between adjacent abutting tubular conduits. It will be understood that the opposite ends of each individual conduit is of generally the same configuration as is shown in FIG. 2. Each individual concentric insulating member 2 comprises an outer tubing 4 and an inner tubing 6. The outer tubing 2 comprises a straight cylindrical member having conventional threads 10 at each end. A conventional external coupling 8 engaging threads 10, can be used to join adjacent concentric members. In order to reduce the number of welds needed to secure inner tubing 6 to outer tubing 4, the end of inner tubing 6 is outwardly flared, as shown in FIG. 2. A single circular face weld 30 can then be made between inner tubular 6 and outer tubular 4.

In the assembled configuration of a single insulating tubing conduit, as shown in FIG. 2, an annular cavity 13 is formed between outer tubing 4 and inner tubing 6. This annular cavity 13 may be filled with thermal insulation. In the preferred embodiment of this invention, this thermal insulation comprises a combination of a blanket insulation 12 having ceramic fibers and a reflective heat shield 18. At least one rigid cylindrical centralizer 14 is located within annular cavity 13 between the welded ends joining outer tubing 4 to inner tubing 6. This rigid centralizing member 14 comprises an axially extending cylindrical section 14b and at least one radially extending support section 14a extending between the cylindrical section and the outer tubular member 4. The centralizer is a metal member and in the preferred embodiment the planar member 14a is welded directly to the cylindrical member 14b at 14c. In the preferred embodiment the centralizer comprises two opposed halves positioned concentrically around the inner tubular member 6. Also an insulating substrate 15, such as a fiberglass member is positioned between the inner tubular member and cylindrical half sections 14b. The insulating substrate 15 then prevents direct metal-to-metal contact between cylindrical sections 14b and the hot inner tubular member 6. Metal bands 14d can then be attached around the periphery of the two half-sections to form a single annular centralizing member 14 structurally supporting the outer tubing 4 relative to the inner tubing 6.

The remainder of annular cavity 13 contains a blanket insulation 12, which is also commercially available. Thermal insulating blankets, composed of long mechanically bonded refractory fibers providing a combination of high blanket strength, flexibility and high thermal performance, are commercially available. In the preferred embodiment of this invention, a thermal insulating blanket of the type manufactured by Johns-Manville under the trademarks "Thermo-Mat" or "Ceratex", has been employed to form a convective insulating barrier within annular cavity 13. This insulating blanket can be secured to the inner tubing between centralizing members 14 and the ends of annular cavity 13. This insulating blanket can be secured to inner tubing 4 by wrapping a conventional glass fiber tape around the exterior of the insulating blanket 14. Axially extending slits (not shown) are made in the blanket insulation to permit the radial support members 14a to extend through the blanket insulation into contact with the outer tubular member. In the preferred embodiments of this invention, either a partial vacuum is established in annular cavity 13 to prevent moisture from degrading the performance of the convective insulation or an inert gas, such as argon, is added to the sealed annular cavity.

In addition to the convective insulating barriers provided by blanket insulation 12, a radiant reflective heat shield member 18 can be provided. In the preferred embodiment of this invention, this reflective heat shield is incorporated on the outer surface of inner tubing 6, and comprises a material having a relatively low thermal emissivity. In this embodiment, aluminum foil has been applied around inner tubing 6. This aluminum foil comprises a reflective surface which will further reduce the heat transfer of this tubing assembly.

In the preferred embodiment of this invention, each planar support section 14a comprises a semicircular member with the base welded to the cylindrical section 14b. The semicircular member establishes a point contact with the interior surface of tangentially extending outer tubular member 4. This point minimizes the heat loss flow path between the hotter inner member and the colder tubular member through the planar support section 14a. By fabricating centralizer member 14 of a load bearing metal rather than an insulating material such as calcium silicate, the planar section 14a can have sufficient strength to withstand the loads established by point contact with the outer tubular member. The configuration of this metal centralizer will still have at least comparable heat transfer characteristics as that which would characterize an insulating member comprising an annular ring of insulating material such as calcium silicate.

Annular cavity 13 provides sufficient space to contain insulation for maintaining appropriate heat transfer characteristics over most of the length of this tubing. There does, however, remain a space between interior flared ends on adjacent tubing members. An interior coupling or cylindrical spacer member 20 can be employed to completely isolate the area otherwise bounded by the flared inner tubing ends of adjacent conduits and the outer coupling 8. This interior coupling 20 comprises a cylindrical member having outer sections 24 and 26 having a thickness which is less than the thickness of the central section 28 of the interior coupling member. As shown in FIG. 2, the ends 24 and 26 can be wedged into engagement with tapered section 34 on each inner tubing member 6. Insulation can then be positioned around the exterior of interior coupling 20 to reduce heat loss in the vicinity of the coupling. In the preferred embodiment of this invention, blanket insulation of the same type as blanket insulation 12 used within annular cavity 13 can be affixed around interior coupling central section 28 in a donut fasion. The blanket insulation then fills the cavity bounded by the radiused ends of adjacent interior tubing members and the interior and exterior coupling members. An assembled tubing string or conduit comprising a plurality of individual insulating tubing conduits 2 would then have insulating material positioned within the annular space between inner tubing 6 and outer tubinig 4 along substantially the entire length of the insulating tubing conduit 2. Finally, a second low emissivity barrier or radiant heat shield is provided on the exterior of the outer tubing. The outer tubing can be painted along its entire length to provide this barrier. Two low emissivity barriers will then act to reduce heat transfer over most of the tubing.

The flared ends of inner tubing 6 not only provide an effective means of increasing the performance of the welds, both by reducing their number and by increasing the welded area, but they should also provide for low heat loss by means of conduction through the welded joint. The only heat conductivity path between the junction of the interior coupling 20 and the tapered portion 34 of inner tubing 6 is along the relatively long thin flared tubing itself. No relatively wide bushing member with its inherently greater heat conductivity is necessary. Still, the flared portion of the tubing is thick enough to provide a weld of high integrity.

FABRICATION

One very significant feature of the preferred embodiment of this invention is that it can be fabricated using only conventional and commercially available components. While the concentric conduit 2 can be fabricated by using a wide variety of cylindrical members, the preferred embodiment of this invention can be fabricated by using standard American Petroleum Institute tubulars. In one size, this invention may utilize a standard $2\frac{3}{8}$ inch O.D. A.P.I. J-55 tubing having upset or enlarged ends to allow fabrication, a $4\frac{1}{2}$ inch A.P.I. J-55 casing having non-upset ends can be employed for outer tubing 4. Prior to assembly of the preferred embodiment of this invention, aluminum foil would be wrapped around the inner tubing. The centralizer members 14 may then be attached at appropriate positions along the exterior of the inner tubing by placing two half sections around the tubing with metal bands 14b securing the cylindrical half shell members together. The metal bands not only provide radial support for the half shell members, but also axially anchor the centralizer assembly at a specific axial location on the tubing joint. The anchored centralizers will then serve to stablize the blanket centralizers along tubing section. The fiberglass insulating substrate 15 have been first positioned between cylindrical sections 14b and inner tubular member blanket insulation 12 can then be attached over the remaining portion of inner tubing 6. Axially extending slits in the blanket insulation permit planar support section 14a to extend radially into contact with the outer tubular member.

The next step in the fabrication of the final insulating tubing conduit 2 would be the insertion of the inner tubing-insulating assembly into outer tubing 4. Upon insertion, the continuous circumferential surface formed at each free end of the flared inner tubing is positioned adjacent to the interior of the outer tubing around its complete inner circumference and is in position to be attached to the outer tubing. The radiused end of inner tubing 6 can then be welded to outer tubing 4 along one end of the concentric tubing assembly. This first weld 30a extends completely around the junction between inner tubing radius section 32 and the outer tubing 4. Multiple passes may be used to ensure that this weld is structurally sound and completely seals the juncture between inner and outer tubing.

In the preferred embodiment of this invention, it is desired to prestress the tubing assembly by placing the inner tubing 6 in tension and the outer tubing 4 in compression. This prestress is important because of the loads which will be imparted to the conduit during high temperature operation. The outer tubing, although in compression, would serve to maintain the inner tubing member 6 substantially in its prestressed or preexpanded configuration. The length of the concentric tubing assembly should therefore be substantially the same in both the cooled and heated configuration. In addition, the stresses in the concentric tubing assembly should be reduced during operation at elevated temperatures. After the first weld 30a has secured one end of inner tubing to outer tubing, the desired prestress may be imparted by stretching the inner tubing 6 at the opposite end of the concentric tubing assembly. This stretching operation can be accomplished by mechanically pulling the inner tubing while holding the outer tubing fixed, or by heating the inner tubing relative to the outer tubing. In the preferred embodiment of this invention, the inner tubular member 6 would not be initially prestressed beyond its yield point. Since the planar support sections 14a are only in point contact with the outer tubular member and are not rigidly attached, the centralizer is free to move axially relative to the outer tubular member during the stretching and elongation inherent in this prestressing operation.

After the desired amount of prestress is imparted to the inner tubing, a second weld 30b extending completely around the junction between inner tubing and outer tubing is made. Again, this weld may consist of multiple passes to ensure the integrity of the weld. Welds 30a and 30b have not only secured inner tubing member 6 to outer tubing member 4, but have sealed the annular insulating cavity 13 between the inner and outer tubing. In the preferred embodiment of this invention, it is desirable to increase the insulating capacity of the material in annular cavity 13 to establish a vacuum. This vacuum may be established by initially drilling a hole in, or otherwise piercing, the outer tubing 4 to form an opening in the annular cavity 13.

After fabrication of the individual conduits, a plurality of conduits may be assembled to form an insulated tubing string by first inserting an internal coupling 20 in one end of each separate tubular member. The interior coupling is wedged into the flared end of inner tubular member 6. Preferably, each interior coupling member 20 would be inserted farther into one conduit than into the adjacent conduit. If the interior coupling member 20 is wedged into the tapered section 34 of one member farther than into the other, the interior coupling would remain affixed to a designated member upon disassembly. Field disassembly could then be simplified.

The preferred embodiment of this invention thus comprises a prestressed concentric tubing member having thermal insulation along substantially its entire length. Convective, as well as radiant insulation, is provided and the evacuation of the annular cavity between the two concentric tubing members or insertion of an inert gas therebetween prevents moisture in the annular cavity from increasing the heat transfer through the insulation. Rigid metal centralizers, subject to a minimum of outgassing, serve to maintain the convective insulating performance in the sealed annular cavity.

Although the invention has been described in terms of the specified embodiment which is set forth in detail, it should be understood that this is by illustration only and that the invention is not necessarily limited thereto, since alternative embodiments and operating techniques will become appararent to those skilled in the art in view of the disclosure. Accordingly, modifications are contemplated which can be made without departing from the spirit of the described invention.

What is claimed and desired to be secured by Letters Patent is:

1. A concentric double walled thermal insulating conduit for forming a tubular string in a subterranean well to transport a heated fluid between the surface of the well and a subterranean location while minimizing the heat loss from the heated fluid during transport, comprising: an outer tubular member; an inner tubular member, the inner and outer tubular member being attached at each end by means of a rigid sealed connection with the inner tubular member being in prestress tension and the outer tubular member being in prestress compression; an annular insulating cavity defined between the inner and outer tubular member and extending along substantially the entire length of the concentric walled conduit; a fibrous blanket insulating material disposed in said annular insulating cavity; and at least one metallic centralizing means for supporting the inner tubular member relative to the outer tubular member and located intermediate the ends thereof; the centralizing means comprising a cylindrical section at least partially concentrically overlapping a portion of the inner tubular member and multiple load bearing, rigid support sections affixed to the cylindrical section, each comprising a planar section extending radially between the inner and outer tubular members and axially relative to the inner tubular member, each support section being in contact with the interior of the outer tubular member, and an insulating substrate between the cylindrical section and the inner tubular member whereby the centralizing means prevents radial deflection of the inner tubular member relative to the outer tubular member intermediate the attached ends thereof.

2. The conduit of claim 1 wherein each support section comprises a semicircular section affixed to the tubular section, the outer tubular member extending tangentially relative to each semicircular support section, whereby each semicircular member is in point contact with the outer tubular member.

3. The conduit of claim 1 wherein centralizing means disposed at one axial position of the insulating conduit comprises two semicylindrical members disposed in opposed relationship relative to the inner tubular members with at least one radially extending planar support section affixed to each semicylindrical member.

4. The conduit of claim 3 wherein the planar support sections comprise semicircular sections affixed at the base thereof to the semicylindrical members, with the outer tubular member extending tangentially relative to the semicircular support section to establish point contact therebetween.

5. The conduit of claim 4 wherein the support sections are welded to the semicylindrical members.

6. The conduit of claim 1 further comprising an insulating substrate between the cylindrical section and the inner tubular member.

7. The conduit of claim 6 wherein the substrate comprises a fiberglass member.

8. The conduit of claim 1 wherein the annular insulating cavity is evacuated.

9. The conduit of claim 1 wherein the annular insulating cavity contains an inert gas.

* * * * *